United States Patent [19]

MacDougall

[11] Patent Number: 5,634,425
[45] Date of Patent: Jun. 3, 1997

[54] BOAT HULL INCLUDING MOULDED SHELL STRUCTURE

[75] Inventor: Gary D. MacDougall, Auckland, New Zealand

[73] Assignee: Allied Plastics International Limited, Tortola, Virgin Islands (Br.)

[21] Appl. No.: 561,418

[22] Filed: Nov. 21, 1995

Related U.S. Application Data

[60] Continuation-in-part of Ser. No. 475,377, Jun. 7, 1995, Pat. No. 5,601,048, which is a division of Ser. No. 105,720, Aug. 12, 1993, Pat. No. 5,458,844.

[51] Int. Cl.$^6$ ........................................... B63B 5/24
[52] U.S. Cl. .................................................. 114/357
[58] Field of Search .............................. 114/355, 356, 114/357, 358, 274, 56, 57

[56] References Cited

U.S. PATENT DOCUMENTS

| | | | |
|---|---|---|---|
| 1,506,062 | 8/1924 | Henker | 264/310 |
| 1,592,673 | 7/1926 | Nichols | 264/310 |
| 2,839,788 | 6/1958 | Dembiak | 264/310 |
| 3,663,680 | 5/1972 | Ringdal | 264/310 |
| 3,742,995 | 7/1973 | Confer et al. | 264/310 |
| 4,247,279 | 1/1981 | Masters | 425/430 |
| 4,348,972 | 9/1982 | Parsons | 114/357 |
| 4,390,383 | 6/1983 | Van Dongeren | 264/310 |
| 4,773,844 | 9/1988 | Bartels et al. | 264/310 |
| 4,883,626 | 11/1989 | Weideman et al. | 264/310 |
| 4,917,037 | 4/1990 | Hargett | 114/357 |
| 5,036,789 | 8/1991 | Kelly et al. | 114/357 |
| 5,039,297 | 8/1991 | Masters | 264/310 |
| 5,217,667 | 6/1993 | Griffith | 264/310 |

OTHER PUBLICATIONS

Nissen—Out in One Piece—New Zealand Herald—Jun. 16, 1990.

*Primary Examiner*—Stephen Avila
*Attorney, Agent, or Firm*—Abelman, Frayne & Schwab

[57] ABSTRACT

A reinforced plastic hull structure is disclosed, wherein the hull is preferably rotary molded with homogeneously connected inner and outer shell molds, the configuration including a plurality of longitudinally extending stiffening members between the inner and outer shells to which a transverse reinforcing means is connected. The transverse reinforcing means is preferably the unitary floor panel of the boat, which is connected to planar flanges at the freely extending ends of the longitudinally extending stiffening members, both along the central section of the planar floor panel, and at its outward ends.

25 Claims, 8 Drawing Sheets

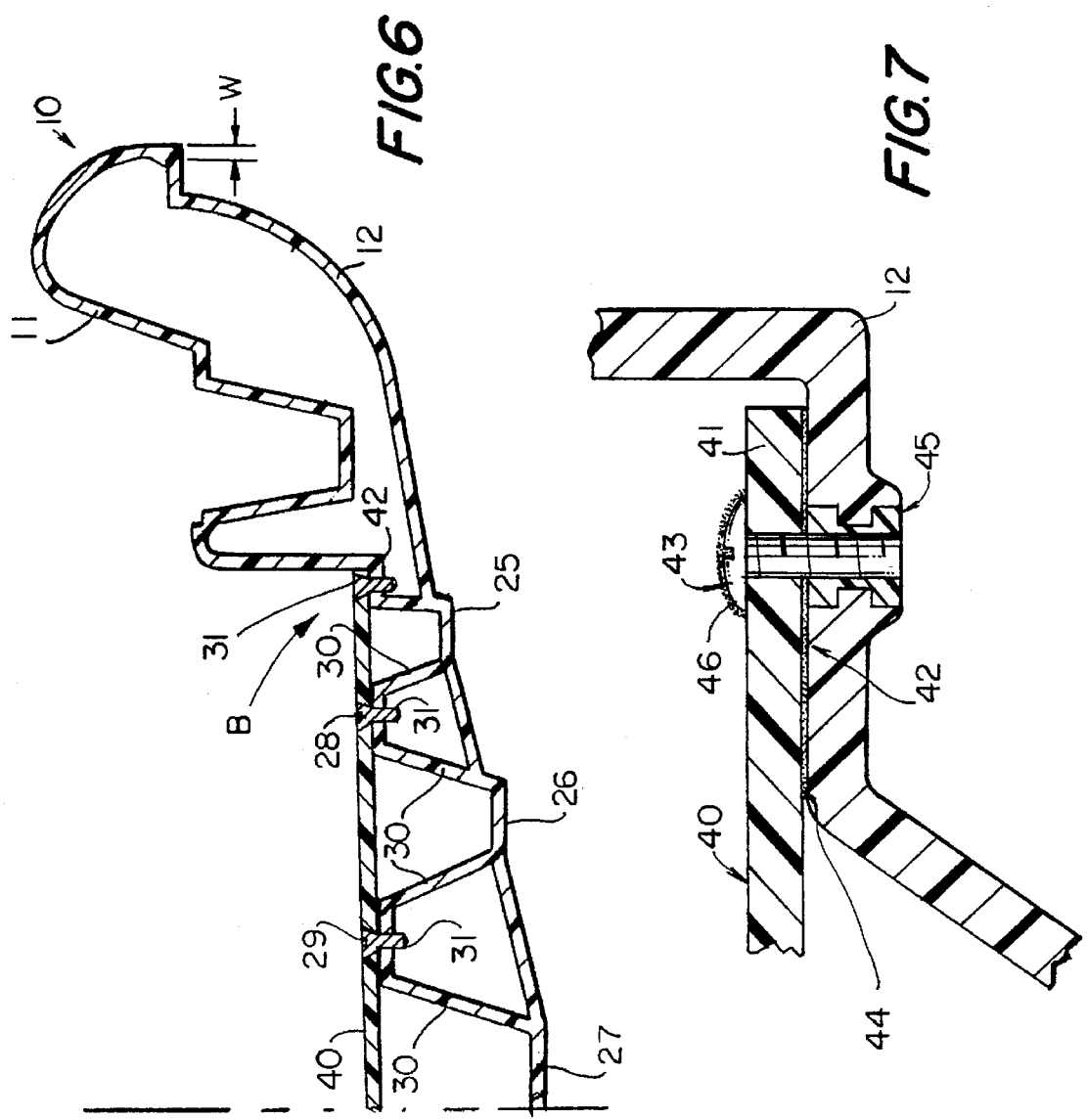

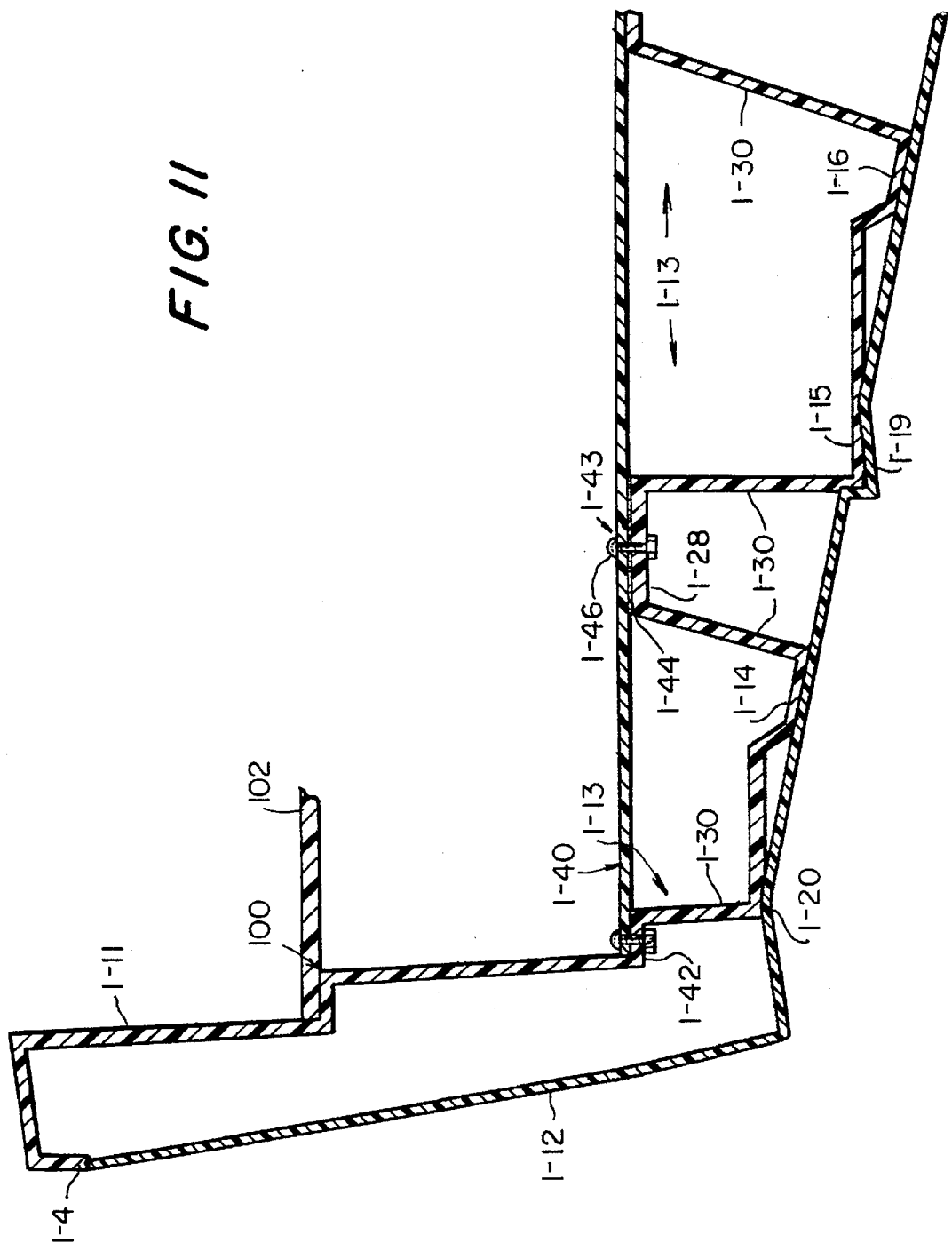

BOAT HULL INCLUDING MOULDED SHELL STRUCTURE

This is a Continuation-in-part of application Ser. No. 08/475,377 of Jun. 5, 1995, now U.S. Pat. No. 5,601,048, which in turn is a division of application Ser. No. 08/105,720 of Aug. 12, 1993, now U.S. Pat. No. 5,458,844.

FIELD OF THE INVENTION

This invention relates to a reinforced plastic boat hull structure which comprises peripherally joined inner and outer shells, a plurality of longitudinally extending stiffening members between the inner and outer shells, and a reinforcing means which extends transversely across the interior of the boat hull structure and is structurally fixed to the inner shell to provide transverse reinforcement. More specifically, the present application is directed to the transverse reinforcing means which is intended to be added to the integrally formed reinforced plastic boat hull structure and method of moulding same which are the subjects of the aforementioned applications.

DESCRIPTION OF THE PRIOR ART

The materials of construction for a boat hull require the combination of formability, strength, attractive appearance, low maintenance and durability in the marine environment. For a very substantial period of time boat hulls of varying sizes have been constructed of wood. However, such boat hulls disadvantageously require substantial maintenance and are subject to deterioration. In addition wooden hulls require substantial labor costs for construction and use of increasingly costly wood materials.

More recently boat hulls have been increasingly constructed of fiberglass. Fiberglass materials can be formed into the shape of boat hulls and the resulting boat hull structure is sufficiently strong for boat hulls and advantageously has greater resistance to deterioration in the marine environment as compared to wooden boats. Hence, fiberglass boat hulls have become an increasingly popular material for boat construction.

There are, however, a number of problems with fiberglass as a material for boat construction. These problems include:

Manufacturing with fiberglass materials can be environmentally problematic. The release of volatile organic compounds that are distressing in both the manufacturing facilities and the immediate environs. The volatile organic compounds used in fiberglass manufacture are hazardous materials and can also be destructive to ozone in the atmosphere.

Both manufacturing waste and non-serviceable fiberglass products cannot be recycled and do not readily deteriorate in landfills. Management of fiberglass wastes is faced with increasing costs and limitation.

Fiberglass boat hulls, particularly in larger boat sizes, require internal reenforcement between the outer hull and the mechanically affixed deck. Such supports are generally provided by spaced vertical members, or "stringers", which are mechanically connected at their opposed edges to the internal surfaces of the hull and deck. As the boat hull is subjected to the stresses of its movement through water and wave, both tension and compression forces act on the outer hull and thus act conversely on the opposed edge of the stringers where they interface with the underside of the deck. This results in significant sheer forces within the stringer and at the interfaces of the stringers with the outer hull or deck. This can cause the rupture of the interconnection of the stringer to the associated hull and deck, resulting in serious damage to the boat hull structure, making it non-serviceable.

It has been suggested that the boat hull be moulded as a hollow plastic shell with an integral foam plastic reinforcement between the inner surfaces of the shell. The use of foam plastic material to provide increased strength between the inner surfaces of a shell is primarily of practical use for smaller size hulls because as the boat size increases the distance between the two shells to be filled with foam also increases. When such a boat hull is impacted, the compressional and tension sheer forces will be experienced in the foam which, similar to the stringers in the fiberglass boat, results in deleterious rupture within the foam and the loss of its required strengthening effect.

Although boats of plastic resins such as polyethylene have many desirable characteristics, it has heretofore not been possible to commercially produce water craft of plastic material in all the most popular recreational sizes. However, overcoming these structural limitations to produce boats of substantial size from plastic, could provide dramatic end benefits to consumers including: First, the boat would be significantly more efficient and maintenance free since the surface characteristics of the plastic are such that sea life will not grow thereon, thereby maintaining a slippery hull. As a consequence, the craft is not only significantly more fuel efficient over the course of use, as well, there is no need for expensive anti-fouling paints finishes. Indeed, since the color is integral throughout the thickness of the plastic, there is no need for a covering paint, thereby avoiding deleterious blistering or cracking. Further, scratches and other abrasions can be buffed away or are less visually disconcerting.

In solving the structural limitations which heretofore have restricted production of plastic boats of size, the present invention enables the taking of full advantage of these benefits. A plastic boat moulded in accordance with aforementioned Ser. No. 08/105,720 and including the transverse reinforcement of the present invention does not require the expensive and time consuming upkeep of prior boats. It is safer since such the hull is rigid, has minimal cosmetic deformation and hence is significantly resistant to damage when impacted. Thus it is less likely than fiberglass to incur damage if it comes in contact with the dock or rocks.

Its displacement is comparable to that of fiberglass boats of like size and thus it can be driven by conventional marine engines mounted in conventional locations and employing conventional mechanics. Moreover, given the less expensive nature of the raw material, marine craft of comparable size to fiberglass can be fabricated at substantially lesser cost.

Recognizing the need to mould plastic boat hulls which can be used for both large and small vessels, aforementioned Ser. No. 08/105,720 disclosed a unique process for forming a reinforced boat hull having appropriate integrally formed longitudinal stiffening members. Due to their integral formation, the supports act in the nature of structural beams moulded to surfaces of the inner and outer shell. The present application includes the addition of transverse reinforcement between the longitudinal stiffening members. As a consequence the hull is able to better withstand the forces encountered during impact to provide the requisite structural strength without rupture of such supporting structure. More specifically, the appropriate number of such longitudinal stiffening members extend between and are positioned within the hollow volume defined by separately molded inner and outer shells. The strengthening provided by such stiffening members permits a relatively wide separation between the inner and outer sections, thus enabling the configuration of significantly larger structural systems which in turn enable the construction of significantly larger vessels. These stiffening members are in the form of beams having integral upper and lower surfaces, and an intermediate connecting web, much like an I-beam. The lower surface is integrally molded to a desired thickness by the joining of opposed, complementary stiffening members forming surfaces of the inner and outer shell moulds. Hence, the integral securement of the lower surface of the stiffening members to the boat hull is along a contact area of increased thickness. Similarly, the upper surface, which receives the transverse reinforcement, preferably as the floor panel, distributes the forces over a large contact area. Such integrally moulded and transversely reinforced stiffening members within the hull are better able to withstand forces generated during use than the stringers typically employed in fiberglass hulls, or the foam material between the inner and outer shells of prior plastic hulls.

One previously known method of forming a boat hull from moulded plastic shells is to mould separate outer and inner shells and then to join the two shells together either by using adhesives, or by fastening devices such as bolts, screws and the like. This method of construction enables the internal surfaces of the hull to be inspected for quality and thickness before assembly, and enables various shaped sections of the hull to be joined together where required to obtain the necessary strength. In particular, it enables hollow girder sections to be formed lengthwise along the hull to provide rigidity of the hull. However, with conventional methods of attachment of the outer and inner shells using fastening devices there are inevitably stress concentrations in the regions of the joints, and in the case of using adhesives there is the possibility of imperfect jointing also leading to local areas of stress concentration. As a result, the joints between the inner and outer shells are susceptible to fatigue failure. Consequently, these methods of construction are not satisfactory for hulls of larger high powered vessels subjected to high operational loadings over long periods of time. It is therefore desirable that the inner and outer shells forming the moulded hull have an integral construction to facilitate even load distribution through the structure thereby minimizing problems of failure at the regions of attachment.

Another drawback with that prior method of construction is that it involves two processes. The first process being to form the two shells and the second process being to join the two shells together. Consequently, the method is time consuming and hence costly.

Accordingly, the rotary moulding process is utilized in my aforementioned applications to reduce production time and improve the juncture of the inner and outer shells and provide internal supports. With the rotary moulding process a complete shell can be moulded in a single step thereby speeding up production and reducing labour costs. With this method, moulds for the outer and inner shells of the hull, such as the hull bottom and stern, and the hull decking, seating and flooring sections respectively are made so that they can be attached together to form a single hollow mould.

In the process, a rotary plastic moulding powder such as Dupont 8405 moulding powder of a predetermined amount is first poured into one of the shell moulds. Then after attaching the moulds together, the resulting hollow mould is heated while being rotated and tilted so that the powder can flow over all internal surfaces of the mould, sticking to the internal surfaces as it melts under heat from the mould and forming into a homogeneous plastic. By programming the sequence and degree of rotation and tilting, the whole of the internal surfaces of the mould can be evenly covered with plastic to a predetermined thickness so that an integral hollow shell is formed. With this method of construction, the peripheral edges of the moulded hull, that were necessarily bonded or fastened together in the conventional two process method, can be formed as homogeneous integral parts of the hull, thereby ensuring even stress distribution in these regions so that fatigue failure is minimized. Furthermore, certain other sections such as those around the centerboard wells, where the bottom surface of the hull is not continuous can also be formed as homogeneous integral parts of the hull connecting the inner and outer shells of the hull together.

According to another aspect of Ser. No. 08/105,720 there is provided a moulded plastic boat hull shell structure formed by the rotary moulding technique, which comprises opposing inner and outer shells which are integrally joined around peripheral portions thereof and which are also integrally joined at adjacent regions within said periphery at a region of continuity of an outer surface of one of the shells. The inner shell is provided with longitudinal stiffening members which are formed integral with the outer shell at regions of continuity of the outer surface of the outer shell.

In this way a moulded hull may be formed wherein predetermined internal support regions may be homogeneously connected. This construction enables longitudinal stiffening members to be located as required within the hull and homogeneously connected to the hull shell, thereby reducing susceptibility to joint failure inherent in bonded or fastened joints and the like. Furthermore, by using a rotary moulding process with a predetermined operation cycle, the hull can be produced quickly and uniformly thereby reducing costs and enhancing quality control.

SUMMARY OF THE INVENTION

A transverse supporting and reinforcing structure is added to the interior of the moulded plastic boat hull structure which has been rotary moulded to include the integrally formed inner and outer shell with spaced longitudinally extending stiffening.

The transverse reinforcing structure comprises at least one structural component, which can be the floor panel of the plastic boat hull, which extends across the interior of the plastic boat hull, over the keel, and is fixed to opposed ends of the inner shell. The longitudinally extending stiffening members advantageously include i) a planar upper flange at the inner shell, with the planar flanges of adjacent longitudinally extending member being disposed in a common plane, ii) a lower face at its juncture to the internal surface of the outer shell, and iii) an intermediate web. The reinforcing means is preferably in the form of a unitary floor panel which is supported by the upper flanges, and mechanically affixed thereto at spaced locations longitudinally along the stiffening members. The connection between the opposed surfaces of the floor panel and upper flanges can be provided by mechanical means, including threaded inserts moulded into the flanges and a plurality of bolts extending through apertures in the floor panel which are in alignment with the threaded insert. Alternatively self tapping screws or thermal welding may be used. Advantageously, the plurality of stiffening means, including their upper flanges for connection to the floor panel, are located on opposite sides of the keel, with at least some of the longitudinal stiffening members being joined to the outer shell coincident with a strake region. To further enhance the rigidized support provided by the floor panel, it will be connected to longitudinal stiffening members which are appropriately located at the free ends of the floor panel and along its central region.

In accordance with an alternative embodiment, the transverse stiffening members may be integrally moulded into the inner shell using the same technique for forming the longitudinal stiffening members. Accordingly, the longitudinal and transverse stiffening members will form a lattice of integral moulded stiffening means which provide both longitudinal and transverse reinforcement of the plastic boat hull.

In accordance with another embodiment, the transverse reinforcement may be provided by beams which extend across the hull and are fixed to the inner shell of the hull at least at its free ends. These beams may be recessed into the longitudinal stiffening members at spaced locations along the length of each such stiffening member either during or after the moulding process. Accordingly, the upper surface of each transverse beam will be coplanar with the upper surfaces of the flanges at the inward end of the longitudinally stiffening members. A floor panel, which in this embodiment will not act as a transverse structural reinforcement member, may then be supported by the top surfaces of the longitudinal stiffening members and transverse beams. Advantageously, wherever the transverse beams and longitudinally stiffening members cross, a mechanical fastener may be inserted.

Accordingly, the present reinforced boat hull structure comprises peripherally joined inner and outer shells, said outer shell including interior and exterior surfaces;
  at least two spaced longitudinally extending stiffening members between said inner shell and the interior surface of said outer shell, said stiffening members including spaced intermediate webs extending between said inner shell and the interior surface of said outer shell, thereby forming hollow structures between said stiffening members for reinforcing the plastic boat hull structure; and
  reinforcing means extending transversely across the interior of the plastic boat hull and structurally fixed to said inner shell to transversely reinforce the plastic boat hull structure.

Accordingly another aspect of the present invention is to provide a plastic boat hull structure which comprises opposed inner and outer shells which are integrally joined around peripheral portions thereof and which are also integrally joined at adjacent regions within said periphery by interior stiffening means including at least two longitudinal stiffening members integrally joined to and extending between said inner shell and said outer shell;
  said longitudinal stiffening members including an upper flange at said inner shell, a lower face at its joining to said outer shell, and an intermediate web between said upper flange and lower face, thereby forming hollow structures between said stiffening members to provide an integrally reinforced plastic boat hull, the upper flanges of said stiffening members being in a substantially coplanar relationship; and
  a floor panel of said boat hull supported by said upper flanges of the longitudinal stiffening members and mechanically fixed to the longitudinal stiffening members at spaced locations along the stiffening members to also provide transverse reinforcing to the plastic boat hull shell structure.

BRIEF DESCRIPTION OF THE DRAWINGS

Aspects of the present invention will now be described by way of example only with reference to the accompanying drawings in which:

FIG. 6 is an enlarged cross-sectional view of a half section of the boat hull of FIGS. 4 and 5, FIG. 7 is an enlarged cross-section of part of the boat hull of FIGS. 4 to 6, indicated by arrow B in FIG. 6.

FIG. 11 is a cross-sectional view of a half section of a boat hull, generally corresponding to FIG. 6, but showing another configuration of the inner and outer shells.

DETAILED DESCRIPTION

Figure 1:
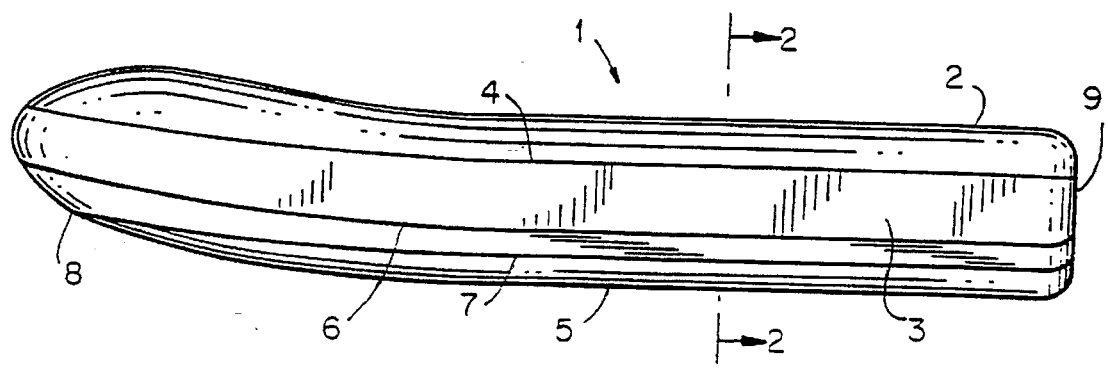
FIG. 1 is a side view of a boat hull in accordance with an embodiment of the present invention.

With respect to FIG. 1 of the drawings there is provided a hull for a power boat generally indicated by arrow 1. As is the subject of aforementioned Ser. No. 08/105,720, the hull 1 is formed from a mouldable plastic material and comprises an inner shell 2 and an outer shell 3. The inner shell 2 is joined to the outer shell 3 along a joint line 4. The outer shell 3 comprises a keel 5 and outboard planing strake or chine 6 and planing strake 7 disposed between the keel 5 and joint line 4 and extending longitudinally from the region of the bow 8 to the region of the stern 9 of the hull 1.

Figure 2:
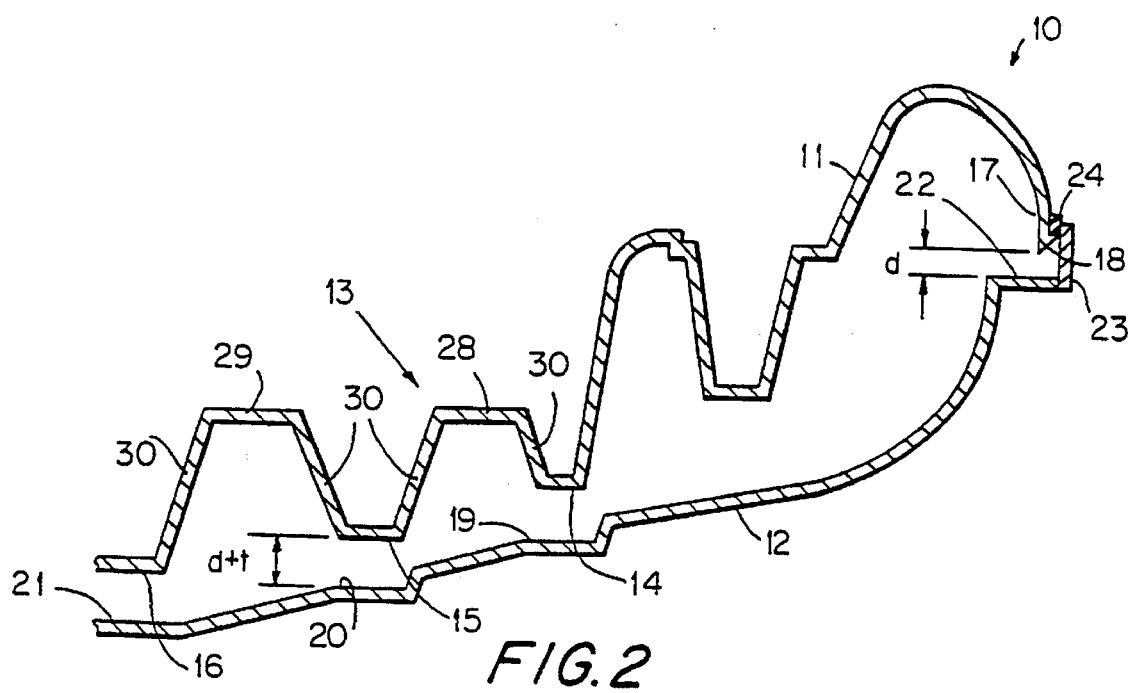
FIG. 2 is a cross sectional view, corresponding to a half section at A—A of FIG. 1, showing the inner and outer shell moulds for moulding the boat hull of FIG. 1, prior to the addition of the transverse reinforcing means, the inner shell mould and outer shell mould being arranged in a separated condition for rotary moulding.

A hull such as that shown in FIG. 1 is formed by means of a rotary shell mould generally indicated by arrow 10 in FIG. 2. For convenience, only a half section of the mould 10 is shown as viewed at a location corresponding to section A—A in FIG. 1. The mould 10 comprises an inner shell mould 11 and an outer shell mould 12.

The inner shell mould 11 is shaped so as to form an inner shell of a boat hull and comprises hull stiffening members generally indicated by arrow 13 extending along a longitudinal axis of the mould 10. The stiffening members 13 have lower faces 14, 15 and 16, upper flanges 28, 29 and intermediate webs 30. Hence, the stiffening members provide a series of internal supports with their lower faces 14, 15, 16 being integrally moulded to and extending inwardly from the outer hull 12, and having spaced intermediate webs 30 with flanges 28, 29 at their opposite ends. An inner parting plate 17 with a wedge shaped protruding rim, or flange 18 inclined to face outward is provided substantially around the entire peripheral edge of the inner shell mould 11.

The outer shell mould 12 is shaped so as to form the outer shell 3 of the boat hull 1, with faces 19 and 20 for forming the chine 6 and planing strake 7 of FIG. 1, and keel face 21 for forming the keel 5 of FIG. 1. The upper peripheral edge of the outer shell mould 12 is formed as a substantially planar mating surface 22. Around the peripheral edge of the mating surface 22 is formed an outer parting plate 23 disposed substantially perpendicular to the mating surface 22.

The inner shell mould 11 and outer shell mould 12 are constructed such that when they are disposed adjacent to each other, the outermost edge of the wedge shaped rim 18 of the inner parting plate 17 is in sliding contact with an inner surface of the outer parting plate 23.

In FIG. 2 the inner shell 11 and outer shell 12 are shown separated from each other by means of a suitable separation mechanism (not shown in the figure) such that predetermined distance "d" is obtained between a bottom edge of the wedge shaped rim 18 and the mating surface 22, and such that the stake faces 19 and 20 and the keel face 21 are respectively separated from the lower faces 14, 15 and 16 of the stiffening members 13 by a distance "d+t" where "t" is the required final thickness of plastic in these regions. With the inner and outer shell moulds 11 and 12 assembled in this condition, moulding powder which has been poured into one of the shell moulds before assembly, is free to flow over the entire internal surface of the inner shell mould 11 and the outer shell mould 12 as the assembled mould 10 is tilted and rotated by a suitable mechanism (not shown in the drawings). To ensure that the moulding powder does not leak out between the contacting edges of the wedge shaped rim 18 and the outer parting plate 23, this area may be sealed with a heat resistant flexible sealant 24 such as a silicone sealer.

The assembled mould 10 filled with a predetermined quantity of moulding powder is then heated by a suitable means, such as by a gas fired oven into which the assembled mould 10 may be placed, to a predetermined temperature and is rotated and tilted according to a predetermined program cycle. This ensures that the powder contained within the assembled mould 10 flows over the entire internal surface of the inner shell mould 11 and outer shell mould 12 and melts to form a skin of a predetermined thickness.

On completion of the program cycle, the separation mechanism is operated so that the inner shell mould 11 and the outer shell mould 12 may be brought together by the before mentioned predetermined amount "d" so that the bottom edge of the wedge shaped rim 18 abuts with the mating surface 22. At this time, any flexible sealant 24 around the peripheral joint is ruptured. During this process the mould plastic is still in a soft state. Consequently plastic formed on the surfaces of the inner face of the parting plate 23, the lower face of the wedge shaped rim 18 and a portion of the mating face 22 is squeezed towards the interior of the mould so that a section along the joint between the inner shell 11 and the outer shell 12 is formed to a predetermined thickness. This is shown as "w" in FIG. 3 which shows a half cross sectional view of the completed plastic hull viewed at A—A of FIG. 1.

Figure 3:
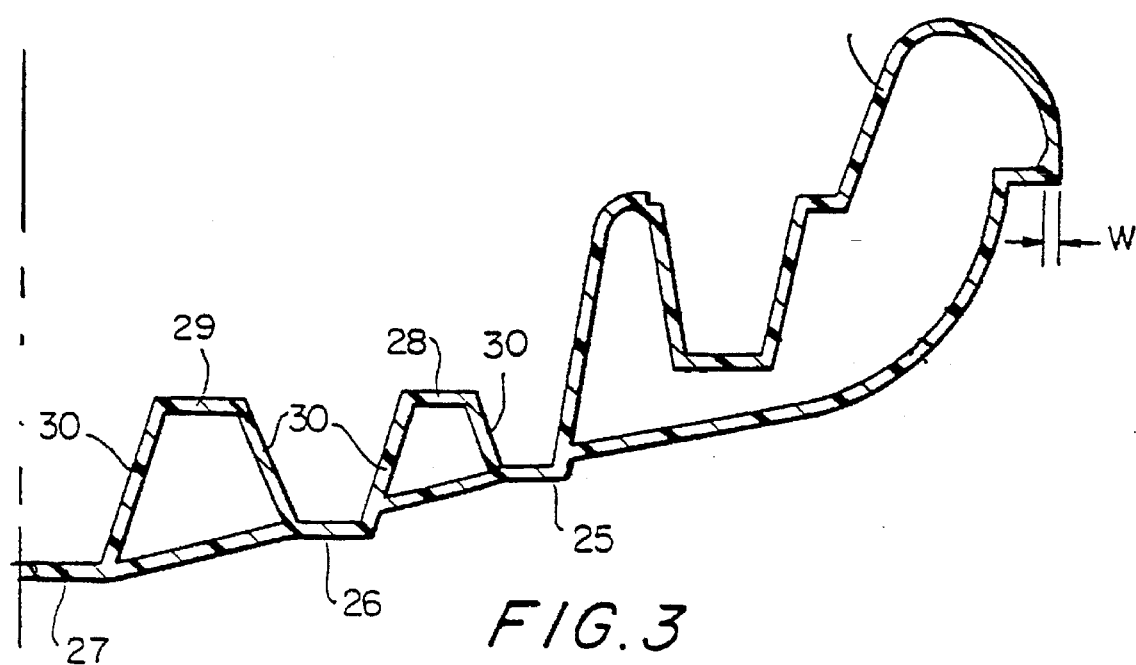
FIG. 3 is a cross sectional view at A—A in FIG. 1 of the boat hull formed by the moulds of FIG. 2.
Figure 4:
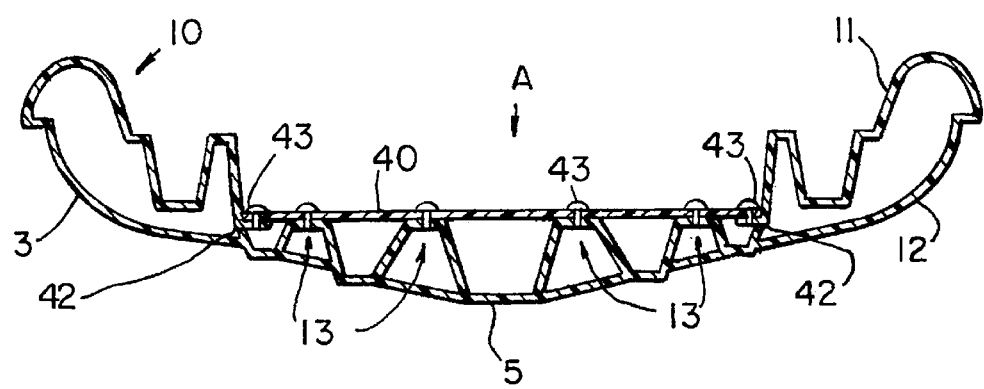
FIG. 4 is a cross-sectional view, corresponding to a full section at A—A of FIG. 1, of a completed boat hull formed by the moulds of FIG. 2, in accordance with an embodiment of the present invention, and which incorporates a floor panel which also forms a transverse reinforcing means for the boat hull shell structure.

Also at the time of bringing the inner shell 11 and outer shell 12 together, adjacent internal surfaces of the plastic mould material i) covering the lower faces 14, 15 and 16 of the stiffening members 13, ii) the strake face 19, outboard strake face or chine 20 and the keel face 21 respectively are brought together so that the plastic mould material is squeezed together in a soft state thereby forming a homogeneous connection as shown at chine 25, strake 26 and keel portion 27 in FIG. 3. The mould assembly is then allowed to cool and harden after which the inner shell mould 11 is separated from the outer shell mould 12, leaving the completed hull 1 accessible for removal from the outer shell mould 12.

FIGS. 4 to 7 show a completed boat hull of the invention which further includes a transverse panel 40 fitted to the interior of the boat hull. The panel 40 may comprise polyethylene, polyethylene and wood laminates, marine grade plywood, aluminum, or other suitable material. Panel 40, which may form the floor panel of the boat hull, is fixed to the inner shell 11 by mechanical fastening means such as screws or other threaded fasteners 43 passing through the panel and into the opposed surfaces of the planar upper flanges 28 and 29 of the stiffening members 13. Alternatively, the connection may be achieved by thermal welding of the opposed planar surfaces. Integral ledges 42 are advantageously moulded into the inner shell 11 on either side which are similarly fixed to the free ends of panel 40 and support the edges of the panel 40. The integral ledges 42 in the inner shell preferably support both longitudinal edges 41 of the panel 40. Preferably a number of fastening means 43 extend through the panel 40 and into each stiffening member 13 at spaced locations along the length of the stiffening members to maximize the transverse strength across the hull. Thus, for optimum rigidity and strength panel 40 is connected to the longitudinal stiffening members 13 at spaced locations along both its free ends and central section. Transverse ledges (not shown) may also be provided at the fore and aft edges of the panel to also support the transverse edges of the panel, which may also be fixed to the transverse integral ledges.

The fasteners may comprise self tapping screws 31 which pass through the panel and into the stiffening members 13 as shown in FIG. 6. Alternatively, as shown in FIG. 7, threaded metal inserts 45 may be moulded into the inner shell at spaced locations where threaded fasteners 43 are to be inserted, both along the length of the longitudinal ledges 42 on either side of the boat hull and in the upper planar flanges 28 and 29 of the central stiffening members 13. Inserts 45 are held in place during the moulding step of FIG. 2, by fasteners 43 which pass through suitably located apertures of the inner mold, with their free ends projecting into the region to receive the moulding plastic. After cooling of the moulded hull, the fasteners are removed from the inner mould, with threaded inserts 45 remaining embedded in the moulded inner shell 11.

The longitudinal ledges 42 shown in the figures are provided to support at least the longitudinal edges 41 of the panel 40. Alternatively the outer most longitudinally stiffening member on either side of the hull may be positioned so as to be coincident with the outer longitudinal edge 41 of the panel 40 to support the panel edges.

An intermediate adhesive 44 (such as the urethane Masterbond available from Masterbond, Inc Hackensack, N.J. or the Starbond two component epoxy available from King Plastic Corp., Venice, Fla.) is advantageously applied between the opposed surface of the floor panel 40 and inner shell 12, as well as to provide an encapsulating protective layer 46 about the head of threaded fastener 43, as shown in FIG. 7.

Figure 5:
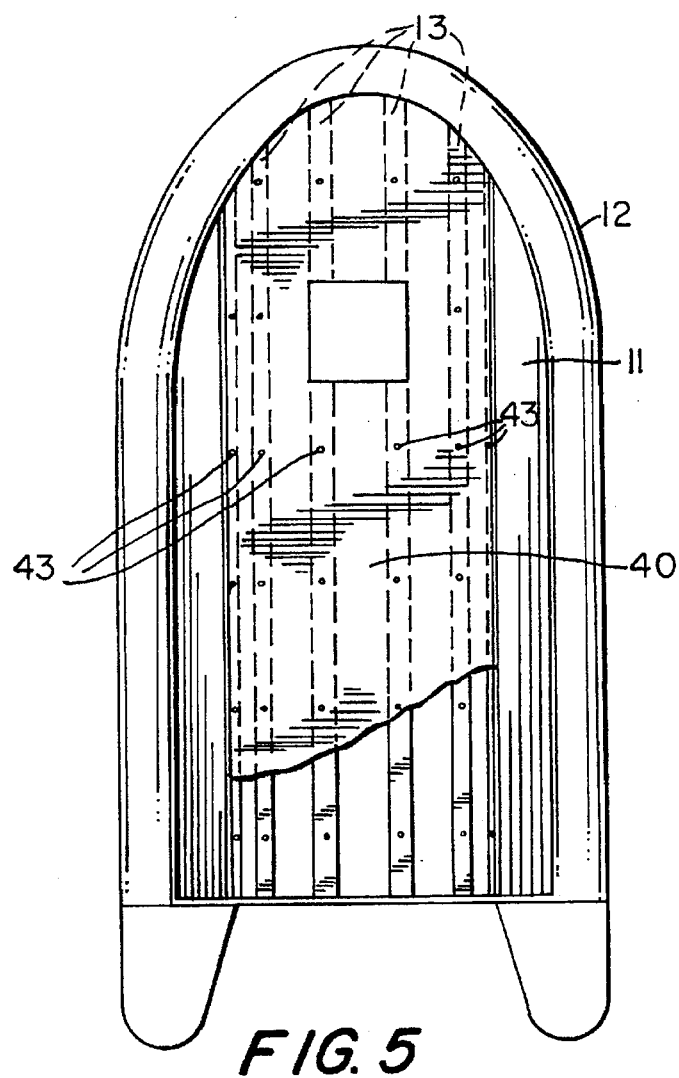
FIG. 5 is a plan view of the completed boat hull shell structure of FIG. 4 in the direction of arrow A of FIG. 4.

Preferably the panel 40 covers all or substantially all of the interior of the boat hull as shown in FIG. 5 and forms a floor or decking surface for the boat hull. In this embodiment, the hull strength provided by the longitudinal stiffening member 13 is further increased, particularly in the transverse direction, by the panel 40 fixed to the stiffening members 13. Preferably all the upper flanges 28 and 29 of the stiffening members 13 are coplanar to support the panel 40 and the panel 40 is fixed to the upper flange of each stiffening member 13. Alternatively, the panel 40 may be supported by the upper flanges of at least some of the stiffening members 13 where the upper flanges of the stiffening members are not all coplanar. However, at least two such stiffening members 13 should be on either side of the boat hull relative to the keel, for connection to the panel 40.

In an alternative arrangement (not shown), brackets fixed to the underside of the panel 40 may secure panel 40 to the web 30 of each stiffening member 13 on either side. However, the previously described arrangement of fasteners passing through the panel 40 and into the upper flanges 28 and 29 of the stiffening members 13 is preferred and simpler to install.

Figure 8:
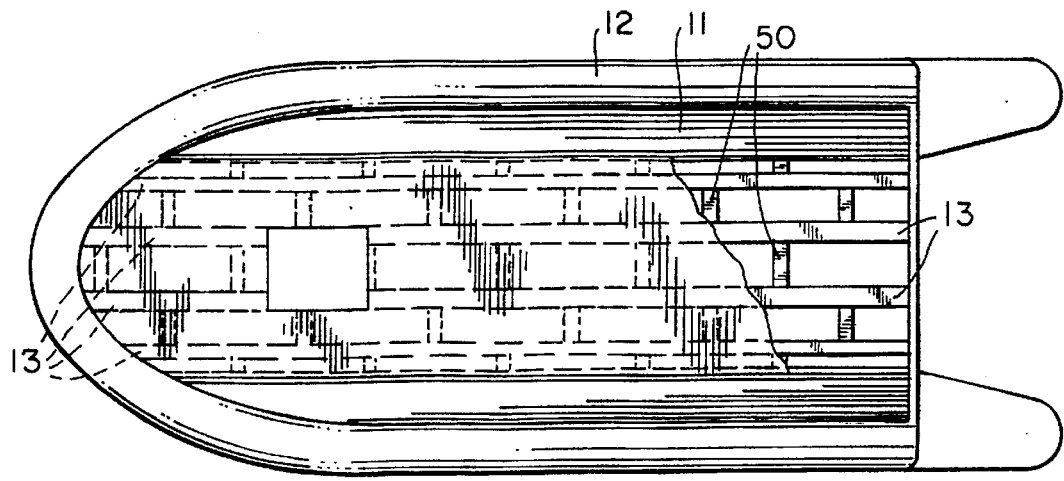
FIG. 8 is a plan view partly cut away of a completed boat hull similar to FIG. 5 but of a further embodiment of the present invention.

FIG. 8 shows yet a further embodiment of the boat hull of the invention where transverse stiffening members 50 are also integrally moulded into the inner shell 11 of the boat hull using the same rotary moulding technique by which the longitudinal stiffening members 13 are formed. Accordingly, the longitudinal stiffening members 13 and transverse stiffening members 50 will form a lattice of integral moulded stiffening members giving both longitudinal and transverse reinforcing to the plastic boat hull. To form such transverse stiffening members, the mould for inner shell 11 is shaped appropriately. When the inner and outer shell moulds are brought together during the moulding process, both longitudinal and transverse integrally moulded stiffening members are formed.

Figure 9:
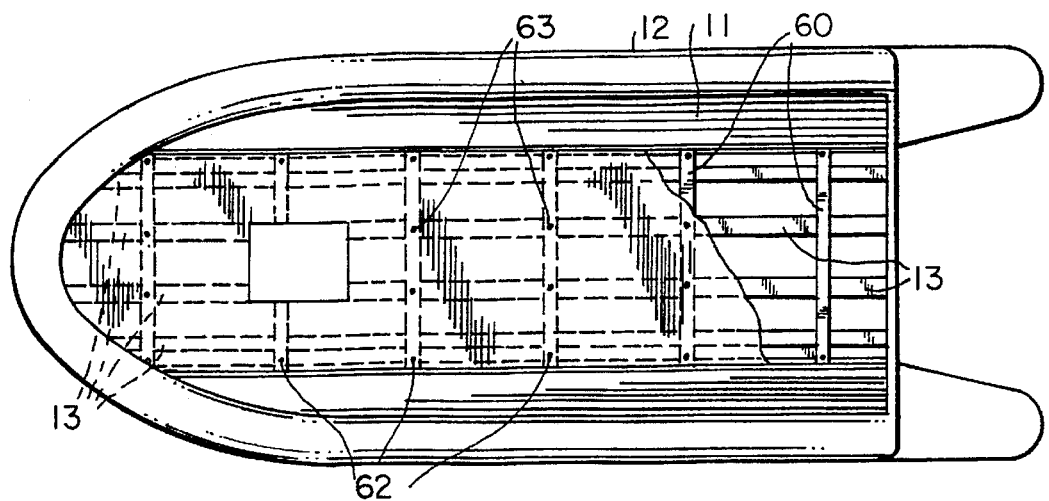
FIG. 9 is a plan view partly cut away of a completed boat hull similar to FIG. 5 but of yet a further embodiment of the present invention.
Figure 10:
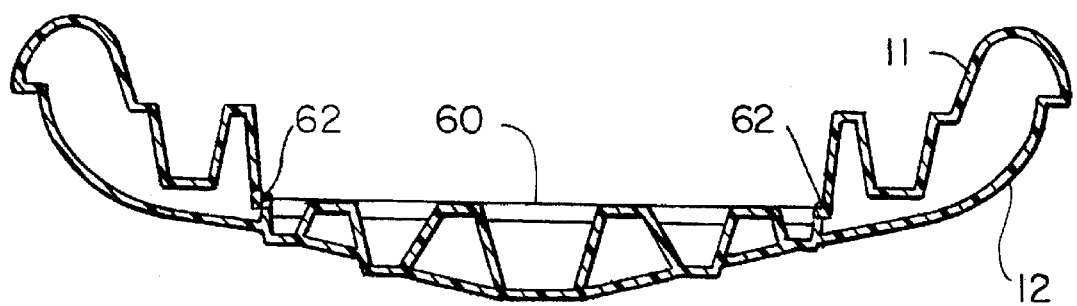
FIG. 10 is a cross-sectional view similar to FIG. 4 but of the boat hull of FIG. 9.

FIGS. 9 and 10 show a further embodiment of the invention where transverse reinforcement is provided by beams 60 extending across the hull and fixed to the inner shell of the hull by connecting means 62 at least at the ends of the beams. These beams 60 can be formed either during the molding process or added thereafter, with mechanical means, thermal welding, or an adhesive. The beams 60 are recessed into the longitudinal moulded stiffening member 13 in recesses formed at spaced locations along the length of each stiffening member 13 during the moulding process. Hence, the upper surface of each beam 60 will be coplanar with the upper flanges 28 and 29 of the stiffening member 13. A floor panel, which in this instance does not act as a transverse structural component, may be supported by the top surfaces of the stiffening members 13 and transverse beams 60. Wherever the transverse beam 60 crosses a stiffening member 13 and is recessed into the stiffening member, a mechanical fastener 63 advantageously passes through the beam 60 and into the stiffening member.

FIG. 11 shows a cross section of one half of the boat hull, generally corresponding to FIGS. 3–7, but with a modified configuration of the inner and outer shells. Components corresponding to those shown in FIGS. 3–7 are identified with similar numerals with the 1 prefix. The inner shell 1-11 includes an additional generally horizontal ledge 100 which is adapted to receive the deck 102. The deck 102 and floor 1-40 may merge along the longitudinal length of the boat as is well known in the art.

Accordingly, the transverse reinforcement for the plastic boat hull structure of the present invention provides several advantages, including the following, which is not intended as an all encompassing list:

The transversely reinforced moulded shell enables secure internal connections to be formed in the hull shell structure such as between the floor panel and longitudinal stiffening members which integrally connect the inner and outer shells of the boat hull, thereby rigidizing the boat hull and reducing the likelihood of failure inherent in other boat hull constructions.

The method of producing the boat hull enables the rotary moulding process to be used for the production of large size boat hulls and similar heavily loaded structures which require reliable connections between transversely reinforced internal stiffening members, thereby enabling the advantages of the rotary moulding process to be realized in the production of such large size structures.

By forming a hull of a boat as an integral unit with one or more internal stiffening members formed homogeneously with inner or outer shells of the hull, and the transverse reinforcement connected to the inner shell, a reliable hull structure can be achieved overcoming problems of failure inherent in other designs.

Forming the hull as an integral unit reduces construction time compared to other methods where the process of moulding the hull is separate from the process of connecting internal surfaces of the hull together by bonding or mechanical attachment methods.

The internal hollow sections can be easily and reliably formed inside a hull of a boat so that girder sections may be designed to provide sealed buoyancy compartments as well as to longitudinally and transversely reinforce the hull.

Aspects of the present invention have been described by way of example only and it should be appreciated that modifications and additions may be made thereto without departing from the scope thereof as defined in the appended claims.

What is claimed is:

1. A reinforced plastic boat hull structure, comprising:

peripherally joined inner and outer shells, said outer shell including interior and exterior surfaces;

at least two spaced longitudinally extending stiffening members between said inner shell and the interior surface of said outer shell, said stiffening members including spaced intermediate webs extending between said inner shell and the interior surface of said outer shell, thereby forming hollow structures between said stiffening members for reinforcing the plastic boat hull structure; and reinforcing means extending transversely across the interior of the plastic boat, spanning between and structurally fixed to at least two adjacent ones of said longitudinally extending stiffening members at their juncture with said inner shell to transversely connect said longitudinally extending stiffening members and reinforce the plastic boat hull structure.

2. A reinforced plastic boat hull structure according to claim 1, wherein:

said boat hull structure includes a keel, a first side relative to said keel and a second side relative to said keel, said first and second sides being on opposite sides of said keel;

said reinforcing means comprises at least one structural component extending across the interior of the plastic boat hull structure, over said keel and fixed to said inner shell at longitudinally extending stiffening members extending along each of said first and second sides.

3. A reinforced plastic boat hull structure according to claim 1 comprising at least three of said spaced longitudinally extending stiffening members, and wherein said reinforcing means extends across and is fixed to each of said stiffening members.

4. A reinforced plastic boat hull structure, comprising:

peripherally joined inner and outer shells, said outer shell including interior and exterior surfaces;

at least two spaced longitudinally extending stiffening members between said inner shell and the interior surface of said outer shell, said stiffening members including spaced intermediate webs extending between said inner shell and the interior surface of said outer shell, thereby forming hollow structures between said stiffening members for reinforcing the plastic boat hull structure; and reinforcing means extending transversely across the interior of the plastic boat hull and structurally fixed to said inner shell to transversely reinforce the plastic boat hull structure;

said reinforcing means extends transversely across the interior of the plastic boat hull structure and is fixed to at least two of said longitudinally extending stiffening members;

at least two of said longitudinally extending stiffening members include a planar upper flange at said inner shell, said planar flanges being disposed in a common plate;

said reinforcing means comprises a floor panel supported by said planar upper flanges of said longitudinally extending stiffening members to form a floor for the boat hulls, and;

connecting means for fixedly connecting said longitudinally extending stiffening members to said floor panel such that said floor panel also provides transverse reinforcing of the boat hull structure.

5. A reinforced plastic boat hull structure, comprising:

peripherally joined inner and outer shells, said outer shell including interior and exterior surfaces;

at least three spaced longitudinally extending stiffening members between said inner shell and the interior surface of said outer shell, said stiffening members including spaced intermediate webs extending between said inner shell and the interior surface of said outer shell, thereby forming hollow structures between said stiffening members for reinforcing the plastic boat hull structure; and said reinforcing means extending across and fixed to each of said stiffening members;

all of said longitudinally extending stiffening members include a planar upper flange at said inner shell, with said planar upper flanges being disposed in a common plate;

said reinforcing means comprises a floor panel supported by said planar upper flanges of said longitudinally extending stiffening members to form a floor for the boat hull, and;

connecting means for fixedly connecting said longitudinally extending stiffening members to floor panel such that said floor panel provides transverse reinforcing of the boat hull structure.

6. A reinforced plastic boat hull structure according to claim 4, wherein said connecting means comprise mechanical fastening means passing through said floor panel and into said planar upper flanges of said longitudinally extending stiffening members at spaced locations along the length of said longitudinally extending stiffening members.

7. A reinforced plastic boat hull structure according to claim 5, wherein said connecting means comprise mechanical fastening means passing through said panel and into said planar upper flanges of said longitudinally extending stiffening members, at spaced locations along the length of said longitudinally extending stiffening members.

8. A reinforced plastic boat hull structure according to claim 6, wherein said mechanical fastening means comprise screw threaded fasteners extending through said floor panel and into threaded inserts moulded into said planar upper flanges of said longitudinally extending stiffening members.

9. A reinforced plastic boat hull structure as in claim 7, wherein said connecting means also connect said floor panel to said planar upper flanges by an adhesive.

10. A reinforced plastic boat hull structure according to claim 4, wherein at least opposite longitudinal edges of said floor panel are fixed to said inner shell at integral ledges moulded in said inner shell.

11. A reinforced plastic boat hull structure as in claim 8, wherein at least some of said longitudinally extending stiffening members are joined to said outer shell coincident with a strake region.

12. A reinforced plastic boat hull structure as in claim 1, wherein said reinforcing means are integrally formed with said inner shell.

13. A reinforced plastic boat hull structure as in claim 4, wherein said reinforcing means are integrally formed with said inner shell.

14. A plastic boat hull comprising:

opposed inner and outer shells which are integrally joined around peripheral portions thereof and which are also integrally joined at adjacent regions within said periphery by interior stiffening means including at least two longitudinal stiffening members integrally joined to and extending between said inner shell and said outer shell;

said longitudinal stiffening members including an upper flange at said inner shell, a lower face at its joining to said outer shell, and an intermediate web between said upper flange and lower face, thereby forming hollow structures between said stiffening members to provide an integrally reinforced plastic boat hull, the upper flanges of said stiffening members being in a substantially coplanar relationship; and a floor panel of said boat hull supported by said upper flanges of the longitudinal stiffening members and mechanically fixed to the longitudinal stiffening members at spaced locations along the stiffening members to also provide transverse reinforcing to the plastic boat hull shell structure.

15. A plastic boat hull as in claim 4, wherein:

said floor panel includes a plurality of spaced interior planar surfaces opposite said upper flanges for connection along said opposed surfaces.

16. A plastic boat hull as in claim 15, further including:

mechanical means for providing the connection between said opposed coplanar surfaces of said floor panel and upper flanges.

17. A plastic boat hull as in claim 16, wherein:

said mechanical means comprises a plurality of threaded inserts molded into said flanges.

18. A plastic boat hull as in claim 17, wherein:

said mechanical means comprises a plurality of bolts extending through apertures in said floor panel which are in alignment with said threaded inserts.

19. A plastic boat hull as set forth in claim 14, wherein:

the connection between said opposed coplanar surfaces of said floor and upper flanges includes an adhesive.

20. A plastic boat hull as in claim 14, wherein:

said plurality of upper flanges are located on opposite sides of a keel.

21. A plastic boat hull as in claim 14, wherein:

at least some of said longitudinal stiffening members are joined to said outer shell coincident with a strake region.

22. A plastic boat hull as in claim 14, wherein said floor panel includes a central section and free end sections, said spaced interior planar surfaces being located at said free end sections and along said central section, and said longitudinal stiffening member include opposed complementary surfaces, whereby said floor panel is connected to said inner shell at its free ends and along its central section.

23. A plastic boat hull comprising:

opposed inner and outer shells which are integrally joined around peripheral portions thereof and which are also integrally joined at adjacent regions within said periphery by interior stiffening means including at least two longitudinal stiffening members integrally joined to and extending between said inner shell and said outer shell;

said longitudinal stiffening members including an upper flange at said inner shell, a lower face at its joining to said outer shell, and an intermediate web between said upper flange and lower face, thereby forming hollow structures between said stiffening members to provide an integrally reinforced plastic boat hull, the upper flanges of said stiffening members being in a substantially coplanar relationship; and at least one transverse reinforcing member supported by and connected to said upper flanges of the longitudinal stiffening members to provide transverse reinforcing to the plastic boat hull shell structure; said transverse reinforcing member including a portion recessed along the intermediate web of the longitudinal stiffening member and an upper surface in coplanar relationship with the upper flanges of said longitudinal stiffening members.

24. A plastic boat hull according to claim 23, including a plurality of said transverse reinforcing members, spaced along the longitudinal extent of the longitudinal stiffening members, each including an upper surface in coplanar relationship with the upper flanges of said longitudinal stiffening members.

25. A plastic boat hull according to claim 24, wherein the coplanar surfaces of said longitudinal stiffening members and transverse reinforcing members are adapted to receive a boat floor panel.

* * * * *